United States Patent
Ni et al.

(10) Patent No.: US 10,345,149 B2
(45) Date of Patent: Jul. 9, 2019

(54) METHOD OF SPECTROMETER AND SPECTROMETER

(71) Applicant: Graduate School at Shenzhen, Tsinghua University, Shenzhen, Guangdong (CN)

(72) Inventors: Kai Ni, Guangdong (CN); Qian Zhou, Guangdong (CN); Jinchao Pang, Guangdong (CN); Jinchao Zhang, Guangdong (CN); Rui Tian, Guangdong (CN); Mingfei Xu, Guangdong (CN); Hao Dong, Guangdong (CN)

(73) Assignee: GRADUATE SCHOOL AT SHENZHEN, TSINGHUA UNIVERSITY, Shenzhen, Guangdong (CN)

( * ) Notice: Subject to any disclaimer, the term of this patent is extended or adjusted under 35 U.S.C. 154(b) by 56 days.

(21) Appl. No.: 15/206,992

(22) Filed: Jul. 11, 2016

(65) Prior Publication Data
US 2016/0320237 A1    Nov. 3, 2016

Related U.S. Application Data

(63) Continuation of application No. PCT/CN2015/070341, filed on Jan. 8, 2015.

(30) Foreign Application Priority Data

Oct. 15, 2014    (CN) .......................... 2014 1 0545740

(51) Int. Cl.
  *G06F 17/10*    (2006.01)
  *G01J 3/18*    (2006.01)
  *G01J 3/28*    (2006.01)

(52) U.S. Cl.
  CPC . *G01J 3/18* (2013.01); *G01J 3/28* (2013.01); *G01J 2003/1842* (2013.01)

(58) Field of Classification Search
  CPC ...................................... G01J 3/18; G01J 3/28
  (Continued)

(56) References Cited

U.S. PATENT DOCUMENTS 6,583,874 B1 *   6/2003   Suzuki ..................... G01J 3/14
                                                          356/328
2003/0067600 A1   4/2003   Curtiss
(Continued)

FOREIGN PATENT DOCUMENTS

| CN | 101975611 | 2/2011 |
| CN | 102713541 | 10/2012 |

(Continued)

OTHER PUBLICATIONS

International Search Report for PCT/CN2015/070341, dated Jun. 11, 2015, 4 pages with English translation.
(Continued)

*Primary Examiner* — Andre Pierre Louis
(74) *Attorney, Agent, or Firm* — Hamre, Schumann, Mueller & Larson, P.C.

(57) ABSTRACT

A design method of a spectrometer and a spectrometer are disclosed, including the following steps: 1) determining an incident angle of a second incident slit and a groove-shaped cycle of a concave grating; 2) estimating a blaze angle of the concave grating, determining a surface material and a groove-shaped structure of the concave grating; 3) acquiring wavelength-diffraction efficiency curves; 4) determining values of incident angles $\theta_{A1}$ and $\theta_{A3}$ and values of wavelengths $\lambda 2$ and $\lambda 3$, and setting $\lambda 4$ to equal $\lambda 2$; 5) acquiring a record structural parameter and a use structural parameter; 6) determining a manufacture parameter of the concave (Continued)

grating; 7) determining locations of the three incident slits and the three photodetectors relative to the concave grating. The spectrometer acquired by using this method has relatively high diffraction efficiency in most spectrum regions and effectively alleviates the problem of relatively low diffraction efficiency in a broad spectrum region.

3 Claims, 5 Drawing Sheets

(58) Field of Classification Search
USPC .......................................................... 703/2
See application file for complete search history.

(56) References Cited

U.S. PATENT DOCUMENTS

| 2006/0038997 | A1 | 2/2006 | Julian et al. | |
|---|---|---|---|---|
| 2008/0285919 | A1 | 11/2008 | Ho et al. | |
| 2012/0038918 | A1* | 2/2012 | Liu | B29D 11/00269 356/328 |
| 2014/0307322 | A1* | 10/2014 | Crawford | G02B 5/1847 359/576 |

FOREIGN PATENT DOCUMENTS

| CN | 103983354 | 8/2014 |
|---|---|---|
| CN | 104048757 | 9/2014 |
| JP | 2791038 | 8/1998 |
| WO | 2005/095910 | 10/2015 |

OTHER PUBLICATIONS

Office Action of corresponding Chinese Patent Application No. 201410545740.3 dated Nov. 23, 2015, 7 pages.

Chaoming, Li et al., "Micro-spectrometer based on flat field holographic concave grating," Holography, Diffractive Optics, and Applications IV, edited by Yunlong Sheng et al. Proceedings of SPIE. 2010, vol. 7848, 78482C-1, [Online], [Retrieved online on Jul. 3, 2013] Retrieved at: <http://proceedings.spiedigitallibrary.org/>, 6 pages.

Zhou, Qian, et al. "Design Method of Convex Master Gratings for Replicating Flat-Field Concave Gratings," Spectroscopy and spectral Analysis. Aug. 2009, vol. 29, No. 8, pp. 2281-2285. English Abstract.

Zhou, Qian, et al. "Numerical Simulation and Experimental Demonstration of Error Compensation between Recording Structure and Use Structure of Flat-Field Holographic Concave Gratings," Spectroscopy and spectral Analysis. Jul. 2008, vol. 28, No. 7, pp. 1674-1678. English Abstract.

Zhou, Qian et al., "A method to fabricate convex holographic gratings as master gratings for making flat-field concave gratings," Holography, Diffractive Optics, and Applications III, edited by Yunlong Sheng et al. Proceedings of SPIE. 2007, vol. 6832, 68320W-1 [Online], [Retrieved online on Jul. 17, 2916] Retrieved at: <http://proceedings.spiedigitallibrary.org/>, 9 pages.

* cited by examiner

METHOD OF SPECTROMETER AND SPECTROMETER

CROSS REFERENCE TO RELATED APPLICATIONS

This application is a continuation application of PCT/CN2015/070341, filed on Jan. 8, 2015. The contents of PCT/CN2015/070341 are all hereby incorporated by reference.

TECHNICAL FIELD

The present application relates to a design method of a spectrometer, and in particular, relates to a design method of a spectrometer using a concave grating and a spectrometer.

RELATED ART

In recent years, because of the development of modernization in some application fields that need onsite real-time testing, such as environmental monitoring, biomedical sciences, scientific and technological agriculture, military analysis, and industrial process monitoring, it is difficult for large spectrum instruments in laboratories to satisfy the foregoing actual use requirements. Developing small portable spectrum instrument products has important practical significance and a wide market prospect. Among existing small spectrometers, a spectrometer that uses a concave grating for construction exists and usually includes a concave grating, an incident slit, and multiple detectors. Design adjustments are performed on a manufacture parameter of the concave grating, an incident angle of the incident slit, and a relative location between devices, so as to construct a spectrometer, thereby implementing light wave detection within a range of a wavelength band. However, although a spectrometer constructed according to an existing design method can implement light wave detection in a broad spectrum region, corresponding diffraction efficiency in some spectrum regions is relatively low and cannot satisfy application having a high requirement.

SUMMARY

Technical problems to be solved by the embodiments of the present application are: overcoming defects of the foregoing prior art and proposing a design method of a spectrometer and a spectrometer having relatively high diffraction efficiency in most spectrum regions, so as to effectively alleviate the problem of relatively low diffraction efficiency in a broad spectrum region.

Technical problems of the embodiments of the present application are solved by using the following technical solutions:

In a design method of a spectrometer, a concave grating, three incident slits, and three photodetectors are used to construct a spectrometer by design, and a spectrum detection range of the spectrometer is $\lambda_1$ to $\lambda_5$; and the design method includes the following steps: 1) according to a fixed structural parameter of the spectrometer, performing calculation based on an eikonal function series expansion method to acquire an incident angle value when there is a single incident slit and a groove-shaped cycle of the concave grating under the incident angle value, and using the acquired incident angle value as a value of an incident angle $\theta_{A2}$ of a second incident slit; 2) estimating a blaze angle of the concave grating and determining a surface material and a groove-shaped structure of the concave grating; 3) according to a parameter of the concave grating in step 2), acquiring a wavelength-diffraction efficiency curve of the concave grating when the acquired incident angle is the incident angle $\theta_{A2}$ and wavelength-diffraction efficiency curves of the concave grating when incident angles are multiple angles distributed in a range of −10° to 20°; 4) according to variations between the diffraction efficiency under multiple angles and the diffraction efficiency under the incident angle $\theta_{A2}$ obtained in step 3), determining a value of an incident angle $\theta_{A1}$ of a first incident slit, a value of an incident angle $\theta_{A3}$ of a third incident slit, and values of wavelengths $\lambda_2$ and $\lambda_3$, and setting $\lambda_4$ to equal $\lambda_2$; 5) according to the values of the three incident angles $\theta_{A1}$, $\theta_{A2}$, and $\theta_{A3}$, the values of the five wavelengths $\lambda_1, \lambda_2, \lambda_3, \lambda_4$, and $\lambda_5$, and the fixed structural parameter of the spectrometer, based on the eikonal function series expansion method, using optical design software ZEMAX software to perform parameter optimization to acquire a record structural parameter and a use structural parameter; 6) according to the groove-shaped cycle of the concave grating in step 1), the blaze angle, surface material, and groove-shaped structure of the concave grating in step 2), and the record structural parameter acquired in step 5), determining a manufacture parameter of the concave grating, so as to acquire a concave grating that satisfies application; and 7) according to the use structural parameter acquired in step 5), determining locations of the three incident slits and the three photodetectors relative to the concave grating, so as to construct a spectrometer.

A spectrometer, comprising a concave grating, three incident slits, and three photodetectors, where a manufacture parameter of the concave grating and locations of the three incident slits and the three photodetectors relative to the concave grating are acquired according to the foregoing design method.

Beneficial effects of the embodiments of the present application, as compared with the prior art, are:

In a design method of a spectrometer of the embodiments of the present application, a value of a single incident angle is first determined, two other incident angles and band endpoints $\lambda_2$ and $\lambda_3$ in a spectrum detection region ($\lambda_1$ to $\lambda_5$) are then determined by using a comparison variation of a wavelength-diffraction efficiency curve of each incident angle relative to the single incident angle, so as to perform optical design according to the determined values of three incident angles and five wavelengths, a record structural parameter and a use structural parameter are obtained, so as to further determine a structure of a concave grating and relative locations between the concave grating and three incident slits and three photodetectors, and construction is performed to acquire a spectrometer. The constructed spectrometer may achieve an expected objective of detecting a light wave in a range of $\lambda_1$ to $\lambda_5$. During detection, the spectrometer may sufficiently utilize a +2 level diffraction spectrum of a short-wavelength band and a +1 level diffraction spectrum of a long-wavelength band, and with respect to that an existing spectrometer merely utilizes +1 level diffracted light in a spectrum detection range, the spectrometer designed in the embodiments of the present application may sufficiently utilize diffraction information, so that diffraction efficiency is relatively high, which is represented in that diffraction efficiency in most band ranges is increased and a proportion of band regions having the diffraction efficiency of up to 45% to the whole wavelength detection range is also increased (93.4% or above).

DETAILED DESCRIPTION

The present application is further described below with reference to specific implementation manners and the accompanying drawings.

Figure 1:
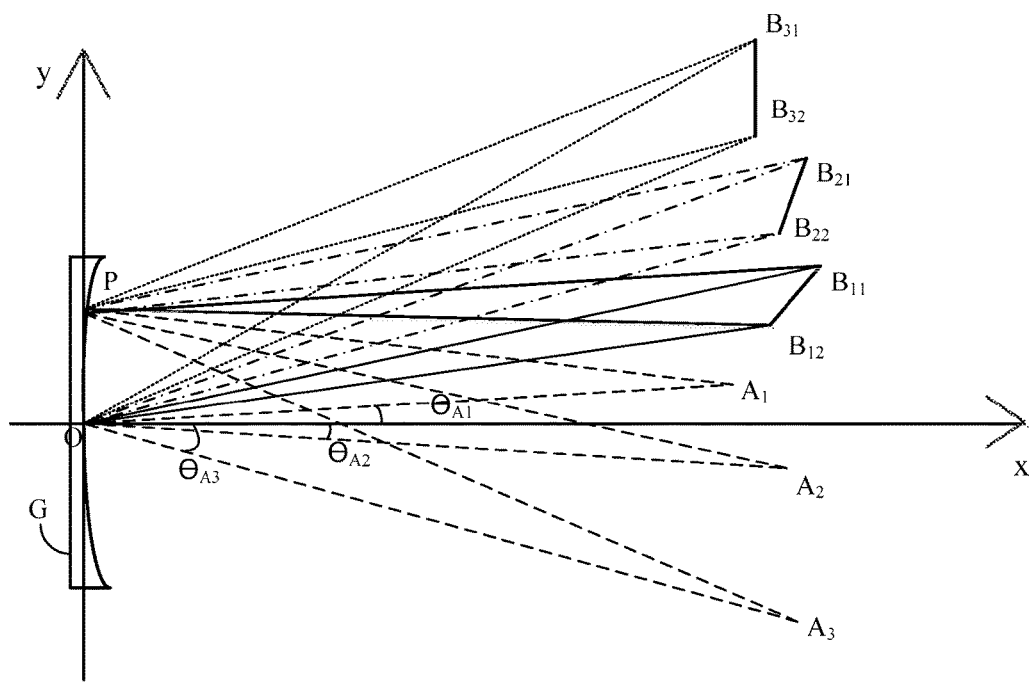
FIG. 1 is a schematic structural diagram of a light path of a spectrometer according to a specific embodiment of the present application.

FIG. 1 is a schematic structural diagram of a light path of a spectrometer according to the present specific embodiment. The spectrometer comprises three incident slits, a concave grating, and three photodetectors. The photodetector may preferably be a photomultipler tube, a pyroelectric detector, a semiconductor photodetector, or a charge-coupled device (CCD) array detector, but is not limited thereto. In FIG. 1, $A_1$, $A_2$, and $A_3$ are incident slits, and $B_{11}B_{12}$, $B_{21}B_{22}$, and $B_{31}B_{32}$ are photodetectors. A coordinate system is established with a central point O of a concave grating G as an origin of coordinates, and along a transmission direction of light, the incident slits, the concave grating G, and the photodetectors are disposed in sequence in the light path. A parameter of the concave grating G and locations of the incident slits and the photodetectors are acquired by design by using the following design method, so as to construct a concave grating spectrometer capable of detecting a light wave having a wavelength range of $\lambda_1$ to $\lambda_5$.

Figure 2:
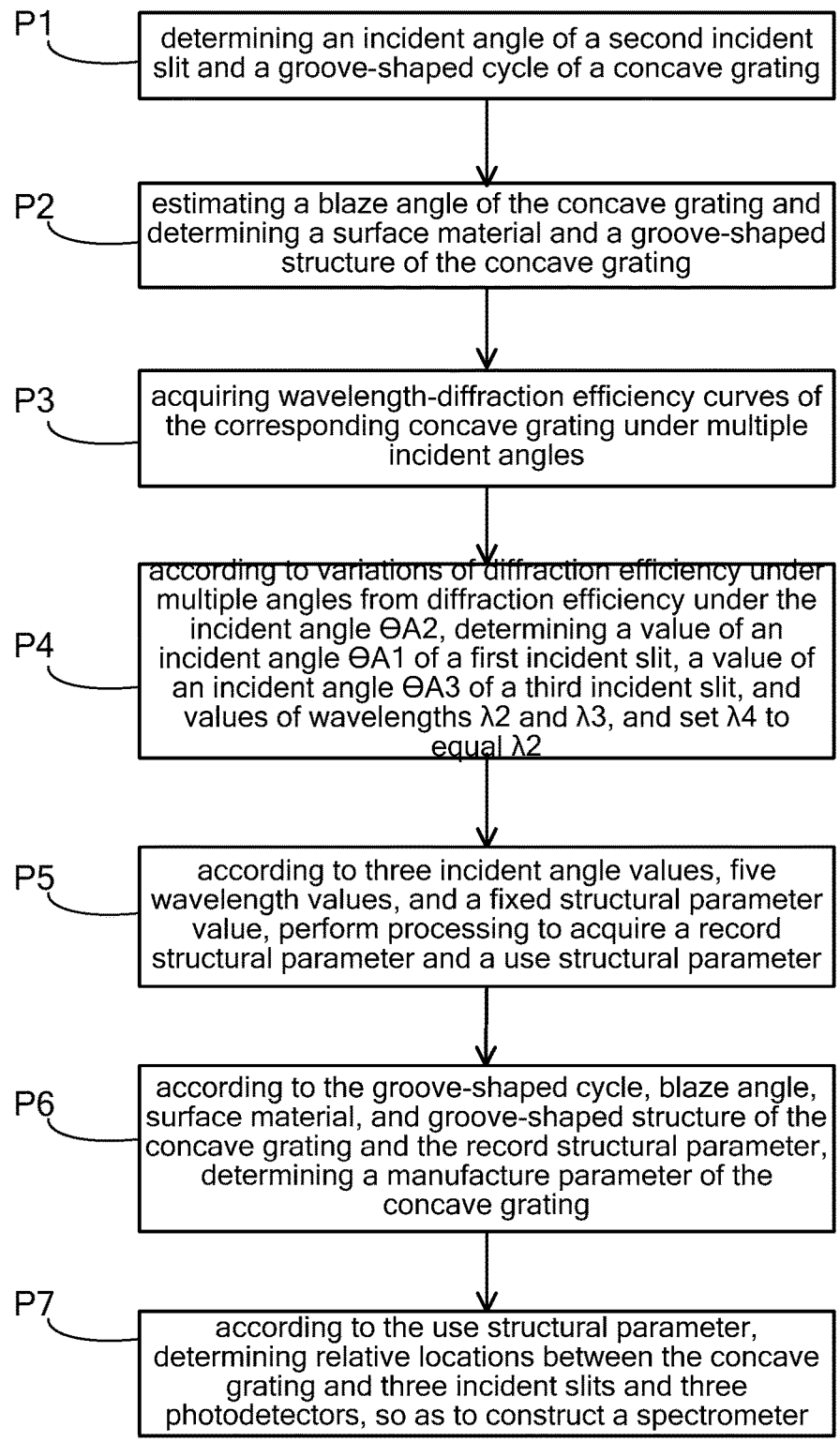
FIG. 2 is a flowchart of a design method of a spectrometer according to a specific embodiment of the present application.

A flowchart of a design method, as shown in FIG. 2, comprises the following steps:

P1) determining an incident angle of a second incident slit and a groove-shaped cycle of a concave grating. Specifically, according to a fixed structural parameter of the spectrometer, calculation is performed based on an eikonal function series expansion method to acquire an incident angle value when there is a single incident slit and a groove-shaped cycle of the concave grating under the incident angle value, and the acquired incident angle value is used as a value of an incident angle $\theta_{A2}$ of a second incident slit.

When a spectrometer needs to be constructed, its fixed structural parameter, for example, a spectrum detection range value, an exposure wavelength, a working level, a side length, a substrate curvature radius, and a grating constant of a selected concave grating, and inherent attribute parameters, such as widths, of three selected incident slits are well-known. According to the fixed structural parameter, an incident angle of the grating when there is a single incident may be acquired by calculation by using an eikonal function series expansion method, and a groove-shaped cycle of the concave grating under the incident angle may be acquired at the same time. The calculated incident angle serves as a value of $\theta_{A2}$. In this specific embodiment, fixed structural parameters of the spectrometer are shown in Table 1 below:

TABLE 1

| Spectrum detection range | 190 nm to 800 nm |
|---|---|
| Exposure wavelength of a concave grating | 441.6 nm |
| Working level of a concave grating | +1 |
| Width of an incident slit | 5 μm |
| Side length of a concave grating | 30 mm |
| Substrate curvature radius of a concave grating | 83.684 mm |
| Grating constant (d/mm) | 1/650 to 1/350 |

It could also be known from the foregoing parameters that $\lambda_1=190$ nm and $\lambda_5=800$ nm. According to the fixed structural parameter in Table 1, calculation is performed to acquire that an incident angle is $-6°$, and a groove-shaped cycle is 350 per millimeter, so $\theta_{A2}=-6°$.

P2) estimating a blaze angle of the concave grating and determining a surface material and a groove-shaped structure of the concave grating.

When the blaze angle is estimated, a wavelength-diffraction efficiency curve of the corresponding concave grating under the incident angle $\theta_{A2}$ is acquired by using PCGrate software when multiple wavelengths in a short-wavelength band range (for example, a spectrum detection range of 190 nm to 800 nm, where a range of 190 nm to 400 nm may be selected for a short-wavelength band in the spectrum detection range) of the spectrum detection range separately serve as blaze wavelengths, and a designer selects, according to experience, a wavelength that is relatively high on both a +1 level of a long-wavelength band and a +2 level of a short-wavelength band as a final blaze wavelength, so as to perform calculation to acquire a blaze angle according to the blaze wavelength. For example, under the incident angle $\theta_{A2}$, five wavelength-diffraction efficiency curves are acquired by respectively using 200 nm, 250 nm, 300 nm, 350 nm, and 400 nm as blaze wavelengths, if it is found that when the wavelength is 250 nm, both the +2 level diffraction efficiency of the short-wavelength band (190 nm to 400 nm) and the +1 level diffraction efficiency of the long-wavelength band (300 nm to 800 nm) are higher than corresponding diffraction efficiency under the four other wavelengths, 250 nm is determined as a final +2 level blaze wavelength of the short-wavelength band. In this specific implementation manner, the estimated +2 level blaze wavelength of the short-wavelength band is 240 nm, and further a blaze angle acquired by estimation is $\gamma=4.68°$.

The surface material and groove-shaped structure of the concave grating may be freely selected by a designer, and in the present specific embodiment, a material, such as Al, customized in PCGrate is selected as a surface material and a groove shape is a saw-tooth shape. Other materials and other groove shapes, such as a trapezoid structure, can all be selectively used, which are not limited to the foregoing illustrative situations.

P3) According to a parameter of the concave grating in step P2), acquiring a wavelength-diffraction efficiency curve of the concave grating when the incident angle is $\theta_{A2}$ and wavelength-diffraction efficiency curves of the concave grating when the incident angles are multiple angles distributed in a range of $-10°$ to $20°$.

Specifically, a wavelength-diffraction efficiency curve diagram may be acquired by using grating design software PCGrate software. The surface material and groove-shaped structure of the concave grating determined in step 2) are input into the grating design software PCGrate software, and a wavelength-diffraction efficiency curve of the concave grating when the incident angle is $\theta_{A2}$ and wavelength-diffraction efficiency curves of the concave grating when the incident angles are multiple angles distributed in a range of −10° to 20° are acquired separately.

Figure 3:
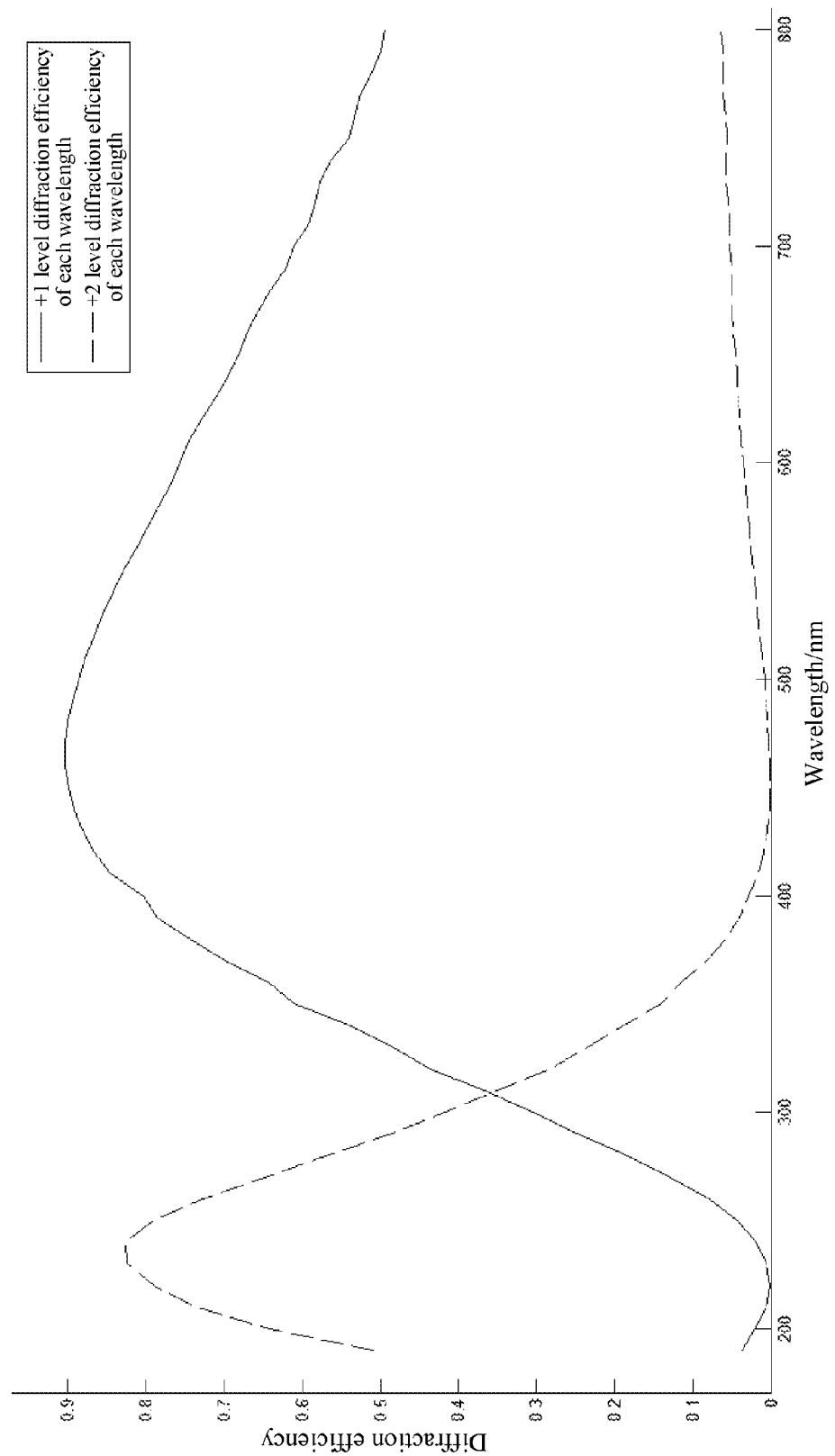
FIG. 3 is a wavelength-diffraction efficiency curve diagram acquired when an incident angle $\theta_{A2}=-6°$ in step P3) during design in a specific embodiment of the present application.

FIG. 3 is a wavelength-diffraction efficiency curve diagram acquired when an incident angle $\theta_{A2}$=−6° in this specific implementation manner. A wavelength-diffraction efficiency curve under a specific incident angle simulated by the PCGrate software includes two curves, which are respectively +1 level diffraction efficiency and +2 level diffraction efficiency of each wavelength, and the two diffraction efficiency curves are both of a parabola shape having a downward opening. It could also be known from the two curves that regions having relatively high diffraction efficiency in +2 level diffraction are centralized in a relative short-wavelength band range and regions having relatively high diffraction efficiency in +1 level diffraction are centralized in a relative long-wavelength band range. Multiple angles distributed in a range of −10° to 20° are selected as the incident angles, more selected angles would lead to higher design precision, but accordingly, a workload is also relatively heavy. Accordingly, wavelength-diffraction efficiency curve diagrams corresponding to the respective angles are acquired, and shapes of the curves are similar to that in FIG. 3, are only shifted in a horizontal direction or a vertical direction, and are not illustrated one by one herein.

P4) According to variations between the diffraction efficiency under multiple angles and the diffraction efficiency under the incident angle $\theta_{A2}$ obtained in step P3), determining a value of an incident angle $\theta_{A1}$ of a first incident slit, a value of an incident angle $\theta_{A3}$ of a third incident slit, and values of wavelengths $\lambda_2$ and $\lambda_3$, and set $\lambda_4$ to equal $\lambda_2$.

Figure 4:
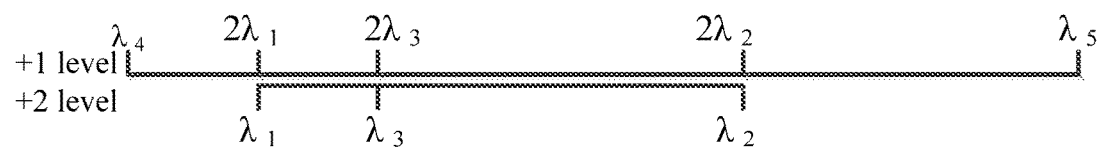
FIG. 4 is a schematic diagram of a spectrum distribution situation detected by a photodetector end in a specific embodiment of the present application.

FIG. 4 is a schematic diagram of a spectrum distribution situation detected by a photodetector end in the present specific embodiment. This design method comprises using multiple incident slits, sufficiently utilizing diffraction spectrums of two levels, so that not only a +2 level diffraction spectrum of a short-wavelength band can be received, but also a +1 level diffraction spectrum of a long-wavelength band can be received, and then setting three points $\lambda_2$, $\lambda_3$, and $\lambda_4$ in a band range, so that by design, not only +2 level diffracted light having a wavelength range of $\lambda_1$ to $\lambda_2$ can be received, but also +1 level diffracted light having a wavelength range of $2\lambda_1$ to $2\lambda_2$ can be received. By design, light waves within range of $\lambda_1$ to $\lambda_2$ and light waves within ranges of $\lambda_4$ to $2\lambda_1$ and $2\lambda_1$ to $\lambda_5$ can be detected, and setting $\lambda_4$ to equal $\lambda_2$ can ensure that a detection range covers a whole range of $\lambda_1$ to $\lambda_5$.

When incident angles of two other incident slits and wavelengths $\lambda_2$ and $\lambda_3$ are determined, selection and determination can be performed according to a variation significance principle. Specifically, if, under a specific angle $\theta_x$, a band exists, for example $\lambda_1$ to $\lambda_x$, and a variation between the diffraction efficiency under the incident angle $\theta_x$ and diffraction efficiency of this band under the incident angle $\theta_{A2}$ is relatively significant, it is determined that $\theta_{A1}=\theta_x$ and $\lambda_3=\lambda_x$, then comparison is continued, and if, under a specific angle $\theta_y$, a band exists, for example $\lambda_3$ to $\lambda_y$, and a variation between the diffraction efficiency under the incident angle $\theta_y$ and diffraction efficiency of this band under the incident angle $\theta_{A2}$ is relatively significant, it is determined that $\theta_{A3}=\theta_y$ and $\lambda_2=\lambda_y$. If in the comparison process, $\theta_y$ and $\lambda_y$ that satisfy conditions do not exist, it is possible that $\lambda_3$ determined in the previous step needs to be adjusted, the previous step is performed again to determine $\theta_{A1}$ and $\lambda_3$ again until $\theta_{A1}$, $\lambda_3$, $\theta_{A3}$, and $\lambda_2$ that satisfy variation significance can be determined after two steps of comparison.

The variation significance principle is that: $\eta_1 \geq 1.9\eta_2$, and $\eta_3 \geq 1.9\eta_4$, where $\eta_1$ represents an absolute value of a relative variation between a diffraction efficiency value corresponding to the angle $\theta_{A1}$ and a diffraction efficiency value corresponding to the angle $\theta_{A2}$ at each wavelength in a range of wavelengths $\lambda_1$ to $\lambda_3$; $\eta_2$ represents an absolute value of a relative variation between the diffraction efficiency value corresponding to $\theta_{A1}$ and the diffraction efficiency value corresponding to the angle $\theta_{AZ}$ at each wavelength in a range of wavelengths $2\lambda_1$ to $2\lambda_3$; $\eta_3$ represents an absolute value of a relative variation between a diffraction efficiency value corresponding to the angle $\theta_{A3}$ and the diffraction efficiency value corresponding to the angle $\theta_{A2}$ at each wavelength in a range of wavelengths $\lambda_3$ to $\lambda_2$; and $\eta_4$ represents an absolute value of a relative variation between the diffraction efficiency value corresponding to $\theta_{A3}$ and the diffraction efficiency value corresponding to the angle $\theta_{A2}$ at each wavelength in a range of wavelengths $2\lambda_3$ to $2\lambda_2$. In the present specific embodiment, it set that $\eta_1 > 2.3\eta_2$, and $\eta_1 > 1\%$, as well as $\eta_3 > 1.9\eta_4$, and $\eta_3 > 3\%$, it is determined the angles are $\theta_{A1}=3°$ and $\theta_{A3}=-17.2°$, and the wavelengths are respectively $\lambda_3=222$ nm and $\lambda_2=310$ nm$=\lambda_4$.

Upon comparison in the foregoing step P4), values of the incident angles of the two other incident slits and the three wavelength $\lambda_2$, $\lambda_3$, and $\lambda_4$ are acquired. So far, after the foregoing steps, it is determined that three angle values, five wavelength values, and the grating blaze angle are acquired. In the present specific embodiment, the three angle values are $\theta_{A1}=3°$, $\theta_{A2}=-6°$, $\theta_{A3}=-17.2°$; and the five wavelength values are $\lambda_1=190$, $\lambda_2=310$, $\lambda_3=222$, $\lambda_4=310$, and $\lambda_5=800$. In addition, the grating blaze angle acquired by estimation is $\gamma=4.68°$. Relative locations between the concave grating and optical devices are designed according to the information as follows.

P5) According to the values of the three incident angles $\theta_{A1}$, $\theta_{A2}$, and $\theta_{A3}$, the values of the five wavelengths $\lambda_1$, $\lambda_2$, $\lambda_3$, $\lambda_4$, and $\lambda_5$, and the fixed structural parameter of the spectrometer, based on the eikonal function series expansion method, use optical design software ZEMAX software to perform parameter optimization to acquire a record structural parameter and a use structural parameter.

In the present specific embodiment, based on the eikonal function series expansion method, parameter optimization is performed by utilizing optical design software ZEMAX software and introducing the three angle values, the five wavelengths, and the fixed structure parameter values in Table 1, so as to acquire the record structural parameters and use structural parameters as shown in Table 2.

TABLE 2

| | | |
|---|---|---|
| Record structural parameters | $r_1$/mm | 99.518 |
| | $r_2$/mm | 114.702 |
| | $\theta_1$/° | 12.404 |
| | $\theta_2$/° | 21.676 |
| Use structural parameters | $r_{A1}$/mm | 86.257 |
| | $\theta_{A1}$/° | 3 |
| | $r_{A2}$/mm | 83.679 |
| | $\theta_{A2}$/° | −6 |
| | $r_{A3}$/mm | 80.916 |
| | $\theta_{A3}$/° | −17.2 |
| | $B_{11}$ | (98.973, 23.234) |
| | $B_{12}$ | (89.9669, 7.268) |

TABLE 2-continued

| | |
|---|---|
| $B_{21}$ | (93.654, 39.035) |
| $B_{22}$ | (88.657, 21.651) |
| $B_{31}$ | (76.816328, 54.112) |
| $B_{32}$ | (77.097, 33.967) |

$r_1$ and $r_2$ respectively represent polar radius lengths of two incident points under polar coordinates when the concave grating is manufactured by using a holographic method; $\theta_1$ and $\theta_2$ respectively represent included angle between a polar radius $r_1$ and an x axis and included angle between a polar radius $r_2$ and an x axis. $r_{A1}$, $r_{A2}$, and $r_{A3}$ represent polar radius lengths of three incident slits under the polar coordinates, and $\theta_{A1}$, $\theta_{A2}$, and $\theta_{A3}$ respectively represent included angle between polar radii $r_{A1}$ and an x axis, included angle between polar radii $r_{A2}$ and an x axis, and included angle between polar radii $r_{A3}$ to the x axis, that is, the foregoing determined incident angles; $B_{11}$, $B_{12}$, $B_{21}$, $B_{22}$, $B_{31}$, and $B_{32}$ are coordinate values of two ends of photodetectors $B_{11}B_{12}$, $B_{21}B_{22}$, and $B_{31}B_{32}$ in the Cartesian coordinate system.

P6) According to the groove-shaped cycle of the concave grating in step P1), the blaze angle, surface material, and groove-shaped structure of the concave grating in step P2), and the record structural parameter acquired in step P5), determine a manufacture parameter of the concave grating, so as to acquire a concave grating that satisfies application. According to the foregoing parameter requirement, a concave grating that satisfies an application requirement can be manufactured by using the holographic method.

P7) According to the use structural parameter acquired in step P5), determine locations of the three incident slits and the three photodetectors relative to the concave grating, so as to construct a spectrometer. Locations of the concave grating, slits, and detectors can be determined according to polar radius length information, angle information, and coordinate information in the use structural parameters, so as to construct a light path, thereby acquiring a concave grating spectrometer.

In conclusion, a spectrometer is acquired by design. When the designed spectrometer works, a light ray passes through an incident slit $A_2$, and after being split and gathered by the concave grating, an emergent light ray is incident on the photodetector $B_{21}B_{22}$, which detects that an energy value thereof is $E_{2\lambda}$. After being split and gathered by the concave grating, an emergent light ray that passes through an incident slit $A_1$ is incident on the photodetector $B_{11}B_{12}$, which detects that energy of $\lambda_1$ to $\lambda_3$ and $2\lambda_1$ to $2\lambda_3$ is $E_{1\lambda}$ and compares $E_{1\lambda}$ with $E_{2\lambda}$. After being split and gathered by the concave grating, an emergent light ray that passes through an incident slit $A_3$ is incident on the photodetector $B_{31}B_{32}$, which detects that energy of $\lambda_3$ to $\lambda_2$ and $2\lambda_3$ to $2\lambda_2$ is $E_{3\lambda}$ and compares $E_{3\lambda}$ with $E_{2\lambda}$. $\eta_1$ represents an absolute value of a relative variation between a diffraction efficiency value corresponding to the angle $\theta_{A1}$ and a diffraction efficiency value corresponding to the angle $\theta_{A2}$ at each wavelength in a range of wavelengths $\lambda_1$ to $\lambda_3$; $\eta_2$ represents an absolute value of a relative variation between the diffraction efficiency value corresponding to $\theta_{A1}$ and the diffraction efficiency value corresponding to the angle $\theta_{A2}$ at each wavelength in a range of wavelengths $2\lambda_1$ to $2\lambda_3$; $\eta_3$ represents an absolute value of a relative variation between a diffraction efficiency value corresponding to the angle $\theta_{A3}$ and the diffraction efficiency value corresponding to the angle $\theta_{A2}$ at each wavelength in a range of wavelengths $\lambda_3$ to $\lambda_2$; and $\eta_4$ represents an absolute value of a relative variation between the diffraction efficiency value corresponding to $\theta_{A3}$ and the diffraction efficiency value corresponding to the angle $\theta_{A2}$ at each wavelength in a range of wavelengths $2\lambda_3$ to $2\lambda_2$. In addition, the three photodetectors $B_{11}B_{12}$, $B_{21}B_{22}$, and $B_{31}B_{32}$ do not interfere each other during spectrum detection. After the energy value is detected, a wavelength range of the light wave is determined according to the following process:

(1): With regard to spectrum overlapping regions $\lambda_1$ to $\lambda_2$ and $2\lambda_1$ to $2\lambda_2$, if the photodetector $B_{21}B_{22}$ does not detect energy of any light wave having a wavelength of $\lambda$ that falls within a range of $\lambda_1$ to $\lambda_2$, it is indicated that wavelengths $\lambda$ and $2\lambda$ do not exist; and if the photodetector $B_{21}B_{22}$ detects energy, the energy is recorded as $E_{2\lambda}$, and step (2) is performed.

(2): An incident slit $A_1$ and the photodetector $B_{11}B_{12}$ are used to determine $\lambda_1$ to $\lambda_3$ and $2\lambda_1$ to $2\lambda_3$, and an incident slit $A_3$ and the photodetector $B_{31}B_{32}$ are used to determine $\lambda_3$ to $\lambda_2$ and $2\lambda_3$ to $2\lambda_2$. If $E_{1\lambda} < E_{2\lambda}$, it is indicated that the light wave $\lambda$ falls within the range of $\lambda_1$ to $\lambda_3$. If $E_{3\lambda} < E_{2\lambda}$, it is indicated that the light wave $\lambda$ falls within the range of $\lambda_3$ to $\lambda_2$. If $E_{1\lambda}$ and $E_{3\lambda}$ equal zero, it is indicated that wavelengths $\lambda$ and $2\lambda$ do not exist.

(3) It is determined whether $E_{1\lambda}$ equals $(1-\eta_1)E_{2\lambda}$ or whether $E_{3\lambda}$ equals $(1-\eta_3)E_{2\lambda}$, and if $E_{1\lambda}$ equals $(1-\eta_1)E_{2\lambda}$ or $E_{3\lambda}$ equals $(1-\eta_3)E_{2\lambda}$, it is proved that only a light wave having a wavelength of $\lambda$ exists, and the energy is $E_{2\lambda}$. If $E_{1\lambda}$ does not equal $(1-\eta_{11})E_{2\lambda}$ or $E_{3\lambda}$ does not equal $(1-\eta_3)E_{2\lambda}$, step (5) is performed.

(4) It is determined whether $E_{1\lambda}$ equals $(1-\eta_2)E_{2\lambda}$ or whether $E_{3\lambda}$ equals $(1-\eta_4)E_{2\lambda}$, and if $E_{1\lambda}$ equals $(1-\eta_{12})E_{2\lambda}$ or $E_{3\lambda}$ equals $(1-\eta_4)E_{2\lambda}$, it is proved that only a light wave having a wavelength of $2\lambda$ exists, and the energy is $E_{2\lambda}$. If $E_{1\lambda}$ does not equal $(1-\eta_2)E_{2\lambda}$ or $E_{3\lambda}$ does not equal $(1-\eta_4)E_{2\lambda}$, step (5) is performed.

(5): In another case, $\lambda$ and $2\lambda$ both exist, the specific energy values can be acquired according to three measured values on the detector.

(6): In a case of $\lambda_4$ to $2\lambda_1$, the energy can be acquired directly by using the photodetector, and in a case of $2\lambda_2$ to $\lambda_5$, the energy can be acquired by subtracting energy detected by the photodetector from energy of the +2 level spectrum of $\lambda_4$ to $2\lambda_1$.

By means of the foregoing steps (1) to (6), light wave detection within the ranges of $\lambda_1$ to $\lambda_2$, $2\lambda_1$ to $2\lambda_2$, $\lambda_4$ to $2\lambda_1$, and $2\lambda_2$ to $\lambda_5$, that is, light wave detection within the range of $\lambda_1$ to $\lambda_5$ can be implemented.

The concave grating spectrometer designed in the present specific embodiment may implement light wave detection within the range of $\lambda_1$ to $\lambda_5$. Moreover, in the light wave detection process, not only a +2 level diffraction spectrum of a short-wavelength band ($\lambda_1$ to $\lambda_2$) can be utilized, but also a +1 level diffraction spectrum of a long-wavelength band ($2\lambda_1$ to $2\lambda_2$) can be utilized. With regard to that an existing spectrometer merely utilizes +1 level diffracted light of the whole light wave detection range, because two-level diffraction spectrum information may be sufficiently utilized in the present specific embodiment, relatively high diffraction efficiency is possessed. Specifically, an ordinary spectrometer merely utilizes diffracted light of a +1 level, and does not utilize diffracted light of another level. On two ends of a band, namely, two ends of a curve, the diffraction efficiency is very low, so that the overall diffraction efficiency is relatively low. Moreover, the novel spectrometer of the present specific embodiment utilizes two levels, the +1 and +2 levels, so there are two curve peak values, two blaze wavelengths exist, and two ends of the band is relatively close to both of the blaze wavelengths. Therefore, the diffraction efficiency is relatively high, so that the overall diffraction efficiency is relatively high.

As stated above, an ordinary spectrometer designed according to an ordinary design process is disposed, and performance improvement in terms of diffraction efficiency of the spectrometer of the present specific embodiment is verified by comparing the diffraction efficiency curves of the spectrometer of the present specific embodiment and the diffraction efficiency curve of the ordinary spectrometer.

The ordinary spectrometer comprises a concave grating, an incident slit, and two photodetectors. First, according to a fixed structural parameter of the spectrometer, based on the eikonal function series expansion method and zemax software optimization, an incident angle, a record structural parameter, and a use structural parameter are acquired. Then, the incident angle is introduced, a blaze wavelength that can make diffraction efficiency of the whole band relatively favorable is acquired by using PCGrate software, and further, a blaze angle is determined and acquired according to the blaze wavelength. In this example, the incident angle of the ordinary spectrometer is −4.8°, the blaze wavelength thereof is 300 nm, and the blaze angle thereof is $\gamma=3.05$. Finally, a manufacture parameter of the concave grating is determined according to the blaze angle and the record structural parameter, so as to acquire a concave grating that satisfies application; locations of the incident slit and the two photodetectors relative to the concave grating are determined according to the incident angle and the use structural parameter, so as to perform construction to acquire a spectrometer.

Figure 5:
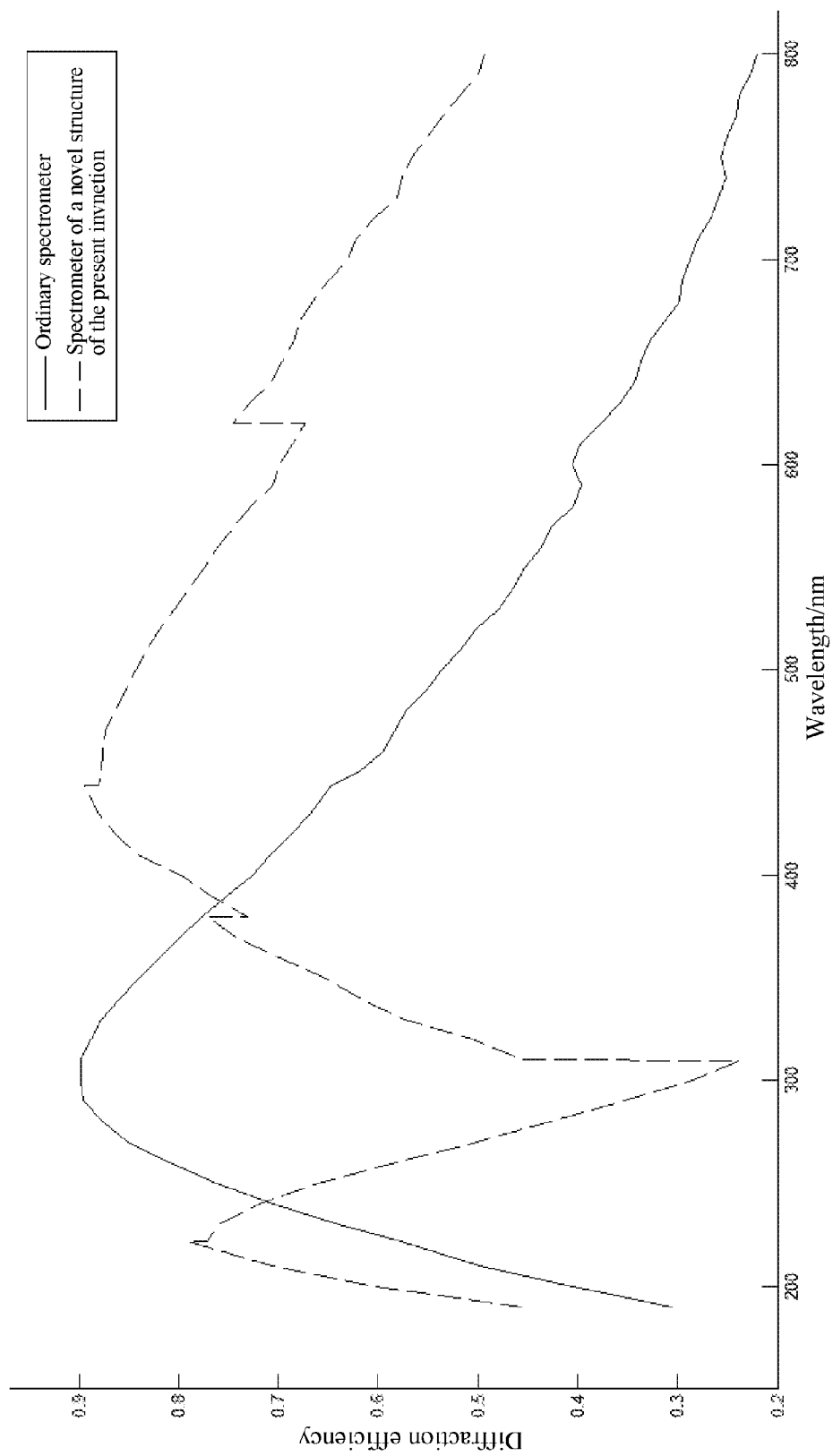
FIG. 5 is a schematic diagram of a comparison between a spectrometer of a novel structure and an ordinary spectrometer at each wavelength in a specific embodiment of the application.

The PCGrate software is used to calculate diffraction efficiency values of the grating spectrometer in this specific implementation manner and the foregoing ordinary spectrometer under each wavelength (190 nm to 800 nm), which have the diffraction efficiency curve diagram as shown in FIG. 5. A dashed line indicates diffraction efficiency of the spectrometer of a novel structure in the present specific embodiment at each wavelength, and the incident angle are respectively 3°, −6°, and −17.2°; and a solid line indicates diffraction efficiency of the ordinary spectrometer at each wavelength, and the incident angle is −4.8°. From FIG. 5, it could be known that when the two structures are in the same case (the "same case" indicates using the same material and the spectrum range and having the same design parameters except for that the incident angles and blaze angles are different during the diffraction efficiency analysis), the diffraction efficiency of the novel structure is improved by 12% to 20% at 190 nm to 230 nm, is improved by about 0-10% at 230 nm to 245 nm and 385 nm to 410 nm, is improved by 15% to 30% at 410 nm to 480 nm, and is improved by about 30% at 480 nm to 800 nm, and the diffraction efficiency of other bands is lowered as compared with the existing spectrometer structure. On a whole, the diffraction efficiency of the spectrometer of the novel structure in the present specific embodiment which is above 45% is 93.4% of the whole wavelength detection range, and the diffraction efficiency which is above 45% is 73.8%; with regard to that the diffraction efficiency of the spectrometer of the ordinary structure which is above 45% is 55.7%, and the diffraction efficiency which is above 60% is 38.5%, the diffraction efficiency of the present specific embodiment is significantly improved.

In conclusion, in the present specific embodiment, the combined use of the +1 level and +2 level blazes of a band are implemented by using three diffraction slits, thereby alleviating the problem of relatively low diffraction efficiency in most spectrum regions of a broad spectrum spectrometer.

The foregoing content is detailed description of the present application with reference to the specific preferred embodiments, but it cannot be considered that the specific implementation of the present application is limited to the description. Several equal replacements or obvious variations with the same performance and usage made by persons of ordinary skill in the art without departing from the idea of the present application all should be considered as falling within the protection scope of the present application.

What is claimed is:

1. A method of constructing a spectrometer, wherein a concave grating, three incident slits, and three photodetectors are used to construct the spectrometer by design, and a spectrum detection range of the spectrometer is $\lambda_1$ to $\lambda_5$, the method comprising:

1) according to a fixed structural parameter of the spectrometer, performing calculation based on an eikonal function series expansion method to acquire an incident angle value when there is a single incident slit and a groove-shaped cycle of the concave grating under the incident angle value, and using the acquired incident angle value as a value of an incident angle $\theta_{A2}$ of a second incident slit, wherein the fixed structural parameter of the spectrometer comprises a spectrum detection range value, an exposure wavelength, a working level, a side length, a substrate curvature radius, a grating constant of the concave grating, and widths of the three incident slits;

2) estimating a blaze angle of the concave grating and determining a surface material and a groove-shaped structure of the concave grating;

3) according to a parameter of the concave grating in step 2), acquiring a wavelength-diffraction efficiency curve of the concave grating when the incident angle is the incident angle $\theta_{A2}$ and acquiring wavelength-diffraction efficiency curves of the concave grating when the incident angles are multiple angles distributed in a range of −10° to 20°;

4) according to variations between a diffraction efficiency under multiple angles and a diffraction efficiency under the incident angle $\theta_{A2}$ obtained in step 3), determining a value of an incident angle $\theta_A'$ of a first incident slit, a value of an incident angle $\theta_{A3}$ of a third incident slit, and values of wavelengths $\lambda_2$ and $\lambda_3$, and setting $\lambda_4$ to equal $\lambda_2$, wherein four values are determined according to the following condition: the determined four values satisfy a condition: $\eta_1 \geq 1.91\eta_2$, and $\eta_3 > 1.9\eta_4$, wherein $\eta_1$ represents an absolute value of a relative variation between a diffraction efficiency value corresponding to the incident angle $\theta_A'$ and a diffraction efficiency value corresponding to the incident angle $\theta_{A2}$ at each wavelength in a range of wavelengths $\lambda_1$ to $\lambda_3$; $\eta_2$ represents an absolute value of a relative variation between the diffraction efficiency value corresponding to the incident angle $\theta_m$ and the diffraction efficiency value corresponding to the incident angle $\theta_{A2}$ at each wavelength in a range of wavelengths $2\lambda_1$ to $2\lambda_3$; $\eta_3$ represents an absolute value of a relative variation between a diffraction efficiency value corresponding to the incident angle $\theta_{A3}$ and the diffraction efficiency value corresponding to the incident angle $\theta_{A2}$ at each wavelength in a range of wavelengths $\lambda_3$ to $\lambda_2$; and $\eta_4$ represents an absolute value of a relative variation between the diffraction efficiency value corresponding to the incident angle $\theta_{A3}$ and the diffraction efficiency value corresponding to the incident angle $\theta_{A2}$ at each wavelength in a range of wavelengths $2\lambda_3$ to $\lambda_2$;

5) according to the values of the three incident angles $\theta_{A}$, $\theta_{A2}$, and $\theta_{A3}$, values of the wavelengths $\lambda_1$, $\lambda_2$, $\lambda_3$, $\lambda_4$, and $\lambda_5$, and the fixed structural parameter of the spectrometer, based on the eikonal function series expansion method, using optical design software ZEMAX software to perform parameter optimization to acquire record structural parameters and use structural parameters, the record structural parameters include $r_1$, $r_2$, $\theta_1$, and $\theta_2$, $r_1$ and $r_2$ respectively representing polar radius lengths of two incident points when manufacturing a concave grating by holography in polar coordinates, $\theta_1$ representing an angle between $r_1$ and an x-axis and $\theta_2$ representing an angle between $r_2$ and the x-axis, the use structural parameters include $r_{A1}$, $r_{A2}$, and $r_{A3}$ represent polar radius lengths of the three incident slits in polar coordinates, and $\theta_{A1}$, $\theta_{A2}$, and $\theta_{A3}$ respectively represent an angle between $r_{A1}$ and the x-axis, an angle between $r_{A2}$ and the x-axis, and an angle between $r_{A3}$ and the x-axis, and the use structural parameters include $B_{11}$, $B_{12}$, $B_{21}$, $B_{22}$, $B_{31}$, and $B_{32}$, which are coordinate values of two ends of photodetectors $B_{11}$, $B_{12}$, $B_{21}$, $B_{22}$, $B_{31}$, and $B_{32}$ in a Cartesian coordinate system;

6) according to the groove-shaped cycle of the concave grating in step 1), the blaze angle, surface material, and groove-shaped structure of the concave grating in step 2), and the record structural parameter acquired in step 5), determining a manufacture parameter of the concave grating to acquire a concave grating that satisfies application; and 7) constructing the spectrometer according to the use structural parameter acquired in step 5), including determining locations of the three incident slits and the three photodetectors relative to the concave grating, locations of the concave grating, the three incident slits, and the three photodetectors being determined according to the use structural parameters to define a light path for the spectrometer.

2. The design method of a spectrometer according to claim 1, wherein:

in the step 2), when the blaze angle is estimated, a wavelength-diffraction efficiency curve of a corresponding concave grating under the incident angle $\theta_{A2}$ is acquired by using PCGrate software when multiple wavelengths in a short-wavelength band range in the spectrum detection range separately serve as blaze wavelengths.

3. The design method of a spectrometer according to claim 1, wherein:

in the step 3), grating design software PCGrate software is used, the surface material and groove-shaped structure of the concave grating determined in step 2) are input, and a wavelength-diffraction efficiency curve of the concave grating when the acquired incident angle is the incident angle $\theta_{A2}$ and wavelength-diffraction efficiency curves of the concave grating when incident angles are multiple angles distributed in a range of −10° to 20° are acquired separately.

* * * * *